US008576742B2

(12) United States Patent
Yoo et al.

(10) Patent No.: US 8,576,742 B2
(45) Date of Patent: Nov. 5, 2013

(54) DYNAMIC SWITCHING BETWEEN COMMON REFERENCE SIGNAL INTERFERENCE CANCELLATION AND RESOURCE ELEMENT PUNCTURING IN A CO-CHANNEL HETEROGENEOUS NETWORK

(75) Inventors: Taesang Yoo, San Diego, CA (US); Tao Luo, San Diego, CA (US); Siddhartha Mallik, San Diego, CA (US); Aleksandar Damnjanovic, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 13/251,990

(22) Filed: Oct. 3, 2011

(65) Prior Publication Data

US 2012/0087261 A1 Apr. 12, 2012

Related U.S. Application Data

(60) Provisional application No. 61/390,533, filed on Oct. 6, 2010.

(51) Int. Cl.
*H04L 12/26* (2006.01)
(52) U.S. Cl.
USPC ........................................................ 370/252
(58) Field of Classification Search
USPC ......... 455/91, 114.2, 130, 295, 296, 39, 63.1, 455/63.2, 500, 501, 507, 517, 524, 67.11, 455/67.13; 370/201, 229, 235, 236, 241, 370/242, 248, 252, 310, 328, 351, 464, 203, 370/208
See application file for complete search history.

(56) References Cited

U.S. PATENT DOCUMENTS

2004/0017777 A1* 1/2004 Chaudhuri et al. ........... 370/241
2006/0007895 A1* 1/2006 Coralli et al. ................. 370/335
(Continued)

FOREIGN PATENT DOCUMENTS

WO        2009009572 A2    1/2009
WO    WO2009009572 A2    1/2009

OTHER PUBLICATIONS

International Search Report and Written Opinion for International Patent Application No. PCT/US2011/054973 dated Dec. 6, 2011.

(Continued)

*Primary Examiner* — Omar Ghowrwal
(74) *Attorney, Agent, or Firm* — Patterson & Sheridan, L.L.P.

(57) ABSTRACT

Communication in a dominant interference scenario may be supported by performing inter-cell interference coordination (ICIC). Resource coordination/partitioning may be performed to allocate resources to a serving Node B located near the vicinity of a strong interfering Node B. The interfering Node B may avoid transmitting on the allocated/protected resources, possibly except for a common reference signal (CRS). A UE can then communicate with the serving Node B on the protected resources in the presence of the interfering Node B and may observe no interference (possibly except for the CRS) from the interfering Node B. When CRS tones of an interferer may collide with control/data tones of a serving cell, CRS interference cancellation (CRS IC) or puncturing of interfered resource elements (REs) may be appropriate. Certain aspects of the present disclosure provide techniques, where the UE may dynamically switch between CRS IC and RE puncturing based on certain parameters.

40 Claims, 8 Drawing Sheets

(56) References Cited

U.S. PATENT DOCUMENTS

| | | |
|---|---|---|
| 2009/0016456 A1 | 1/2009 | Li et al. |
| 2009/0257390 A1 | 10/2009 | Ji et al. |
| 2010/0008282 A1 | 1/2010 | Bhattad et al. |
| 2010/0009705 A1* | 1/2010 | Budianu et al. ............... 455/501 |
| 2010/0189199 A1* | 7/2010 | Lou et al. ..................... 375/341 |
| 2010/0238821 A1 | 9/2010 | Liu et al. |
| 2011/0149894 A1 | 6/2011 | Luo et al. |
| 2011/0170496 A1 | 7/2011 | Fong et al. |
| 2012/0134275 A1* | 5/2012 | Choi et al. .................... 370/241 |

OTHER PUBLICATIONS

Huawei, Impact of Enhanced ICIC Solutions on Performance Requirements, 3rd Generation Partnership Project TSG RAN WG4 Meeting #56, Madrid Spain, Aug. 23-27, 2010, R4-103120, XP050454166, 3 pages.

NTT Docomo, "Interference Coordination for Non-CA-based Heterogeneous Networks," 3rd Generation Partnership Project TSG RAN WG1 Meeting #60bis, Beijing, China, Apr. 12-16, 2010, R1-102307, XP050419698, 11 pages.

Huawei, "Impact of Enhanced ICIC Solutions on Performance Requirements", Partnership Project (3GPP), Mobile Competence Centre;650, Route des Lucioles;F-06921 Sophia-Antipolis Cedex;France,vol. RAN WG4,No. Madrid, Spain;20100823,Aug. 17, 2010,XP050454166,p. 2,line 6-17.

International Search Report and Written Opinion—PCT/US2011/054793—ISA/EPO—Dec. 6, 2011.

NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route des Lucioles ; F-06921 Sophia-Antipolis Cedex ; France, vol. RAN WG1, No. Beijing, china; 20100412, Apr. 7, 2010, XP050419698, [retrieved on Apr. 7, 2010].

* cited by examiner

DYNAMIC SWITCHING BETWEEN COMMON REFERENCE SIGNAL INTERFERENCE CANCELLATION AND RESOURCE ELEMENT PUNCTURING IN A CO-CHANNEL HETEROGENEOUS NETWORK

CROSS-REFERENCE TO RELATED APPLICATION

This application claims priority to U.S. Provisional Application Ser. No. 61/390,533, filed on Oct. 6, 2010, which is expressly incorporated by reference herein in its entirety.

BACKGROUND

I. Field

Aspects of the present disclosure relate generally to wireless communications, and more particularly, to techniques for dynamically switching between interference cancellation and puncturing.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes identifying subframes with interference between transmissions of a serving Node B and one or more non-serving Node Bs, wherein the subframes are identified based on cooperative partitioning of resources between the serving Node B and the one or more non-serving Node Bs, measuring a parameter related to the interference, and based on the measured parameter, determining whether to puncture resource elements (REs) of the subframes or to perform common reference signal interference cancellation (CRS IC) to reduce the interference.

In an aspect of the disclosure, an apparatus for wireless communications is provided. The apparatus generally includes means for identifying subframes with interference between transmissions of a serving Node B and one or more non-serving Node Bs, wherein the subframes are identified based on cooperative partitioning of resources between the serving Node B and the one or more non-serving Node Bs, means for measuring a parameter related to the interference, and based on the measured parameter, means for determining whether to puncture resource elements (REs) of the subframes or to perform common reference signal interference cancellation (CRS IC) to reduce the interference.

In an aspect of the disclosure, an apparatus for wireless communications is provided. The apparatus generally includes at least one processor and a memory coupled to the at least one processor. The at least one processor is generally configured to identify subframes with interference between transmissions of a serving Node B and one or more non-serving Node Bs, wherein the subframes are identified based on cooperative partitioning of resources between the serving Node B and the one or more non-serving Node Bs, measure a parameter related to the interference, and based on the measured parameter, determine whether to puncture resource elements (REs) of the subframes or to perform common reference signal interference cancellation (CRS IC) to reduce the interference.

In an aspect of the disclosure, a computer-program product for wireless communications is provided. The computer-program product generally includes a computer-readable medium having code for identifying subframes with interference between transmissions of a serving Node B and one or more non-serving Node Bs, wherein the subframes are identified based on cooperative partitioning of resources between the serving Node B and the one or more non-serving Node Bs, measuring a parameter related to the interference, and based on the measured parameter, determining whether to puncture resource elements (REs) of the subframes or to perform common reference signal interference cancellation (CRS IC) to reduce the interference.

DETAILED DESCRIPTION

Communication in a dominant interference scenario may be supported by performing inter-cell interference coordination (ICIC). According to certain aspects of ICIC, resource coordination/partitioning may be performed to allocate resources to a serving Node B located near the vicinity of a strong interfering Node B. The interfering Node B may avoid transmitting on the allocated/protected resources, possibly except for a common reference signal (CRS). A UE can then communicate with the serving Node B on the protected resources in the presence of the interfering Node B and may observe no interference (possibly except for the CRS) from the interfering Node B. When CRS tones of an interferer may collide with control/data tones of a serving cell, CRS interference cancellation (CRS IC) or puncturing of interfered resource elements (REs) may be appropriate. Certain aspects of the present disclosure provide techniques, where the UE may dynamically switch between CRS IC and RE puncturing based on certain parameters.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
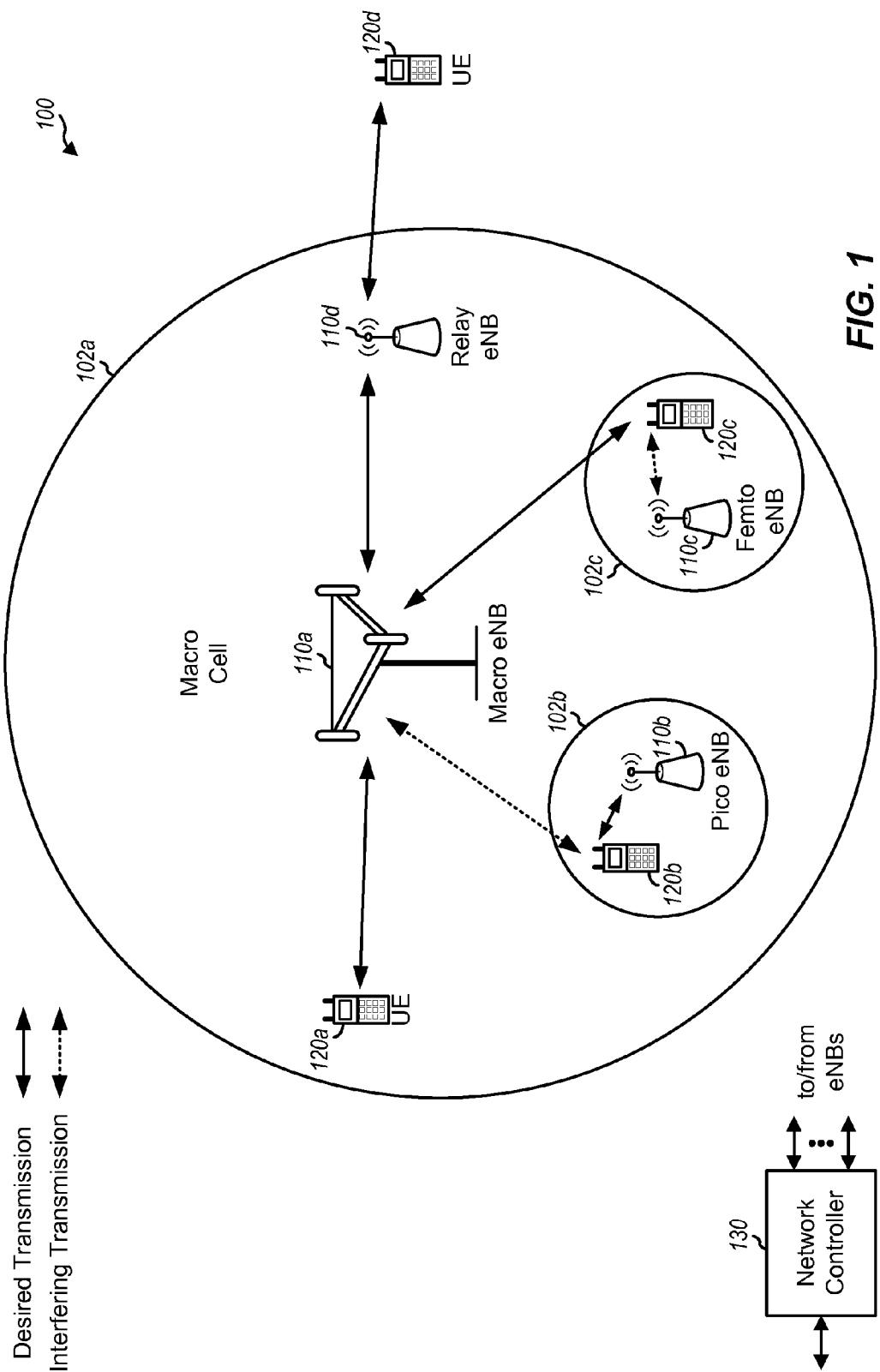
FIG. 1 is a block diagram conceptually illustrating an example of a wireless communications network in accordance with certain aspects of the present disclosure.

FIG. 1 shows a wireless communication network 100 in which procedures described for dynamically switching between interference cancellation and puncturing may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
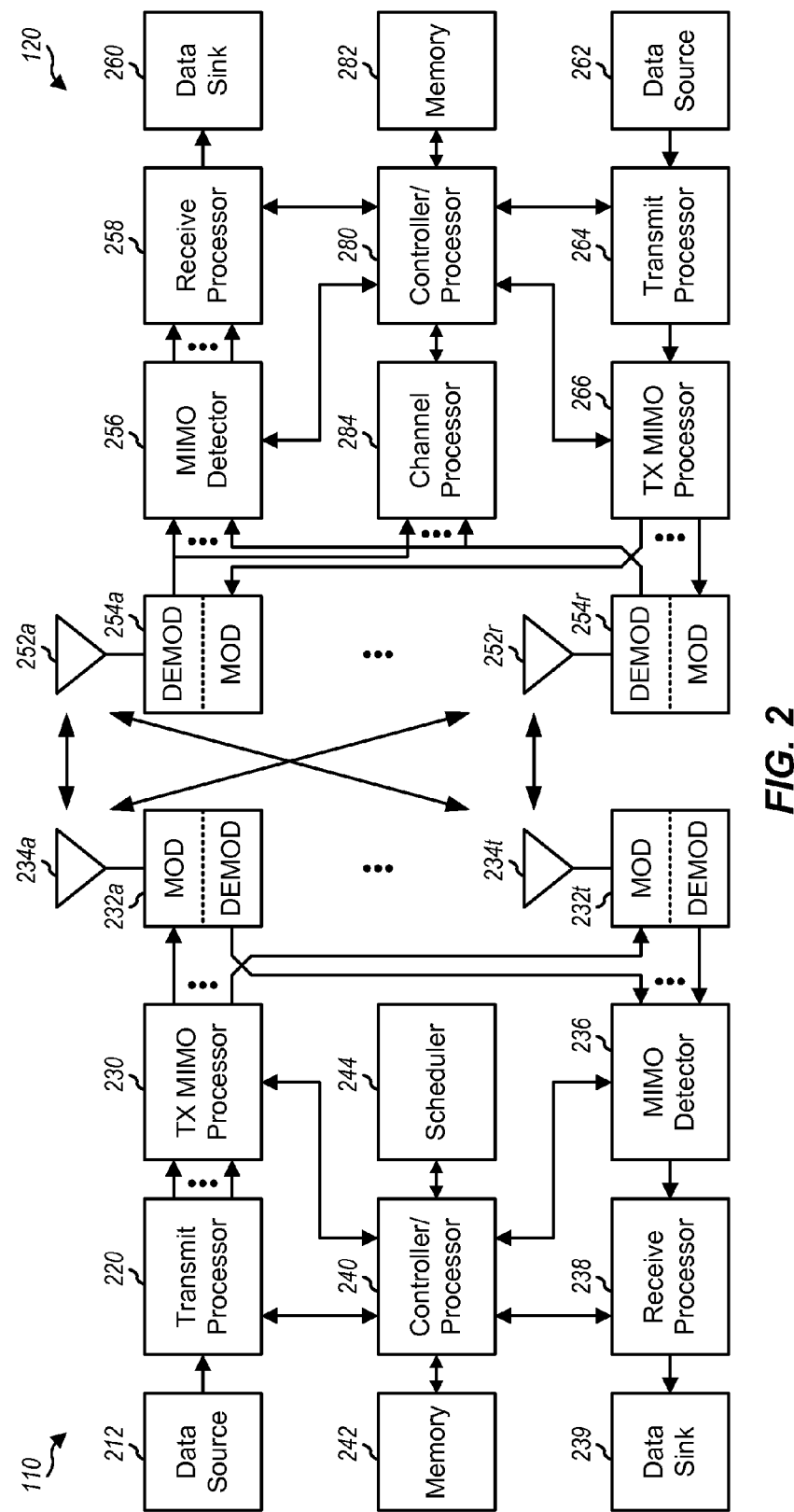
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
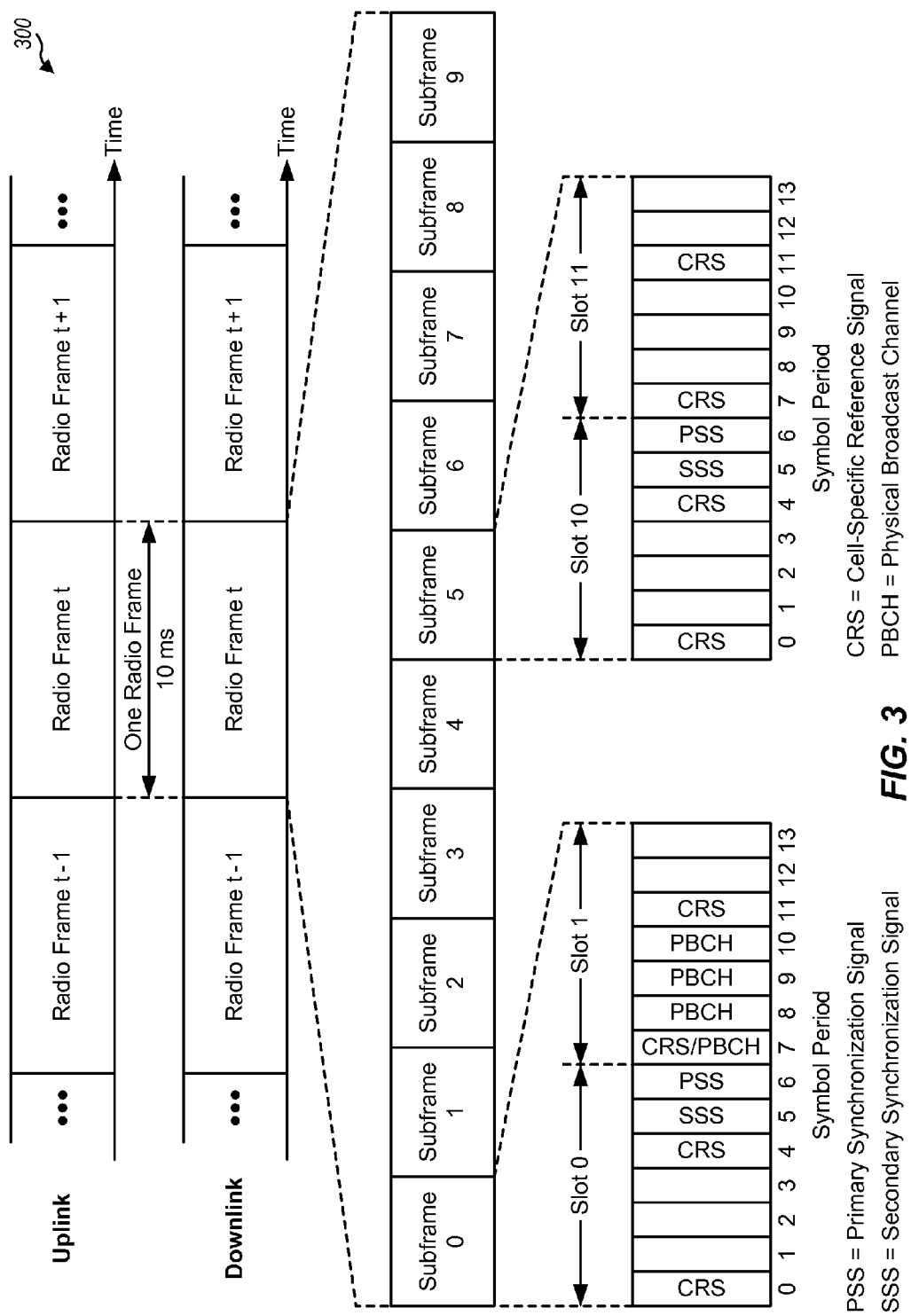
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
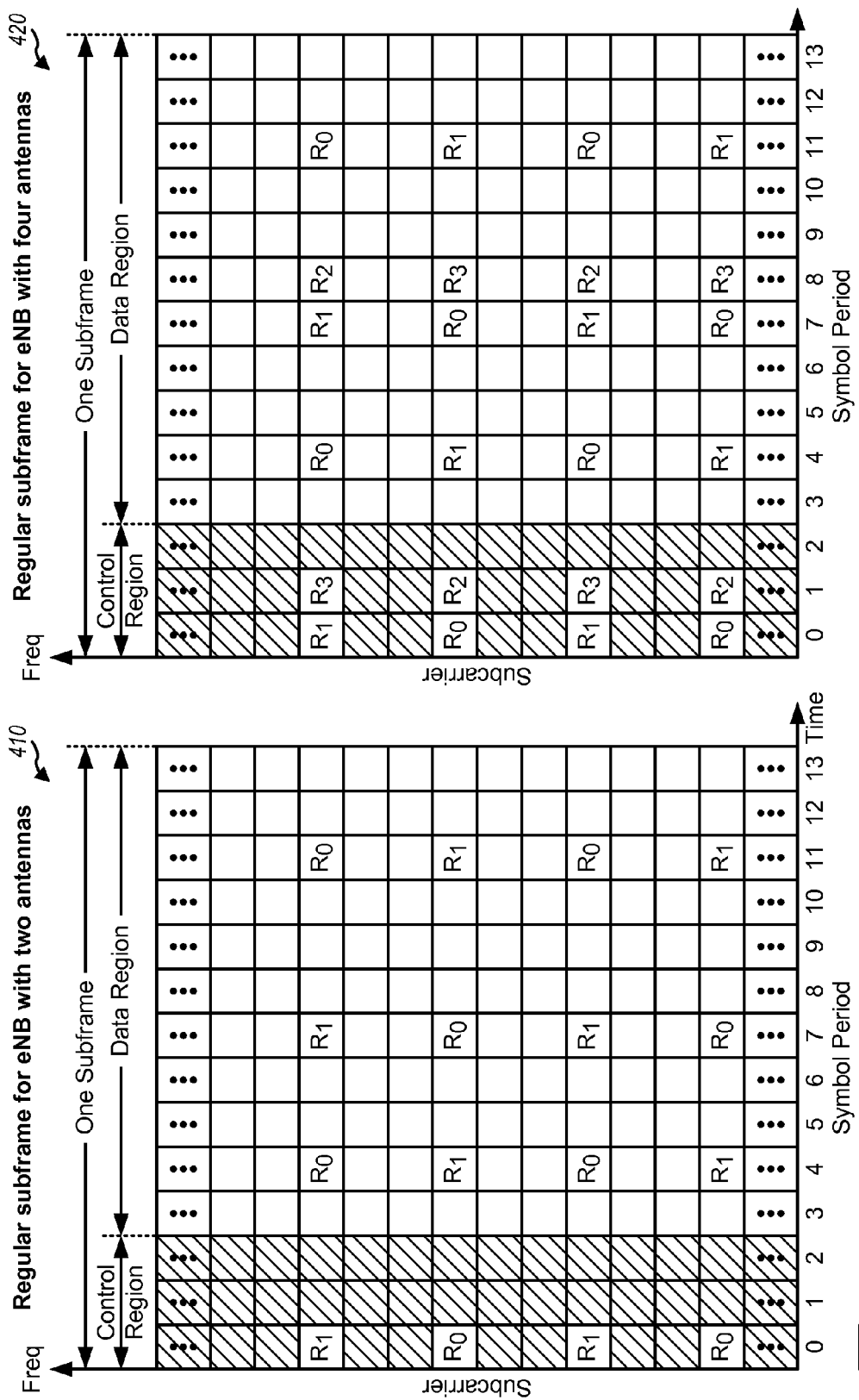
FIG. 4 illustrates two exemplary subframe formats for the downlink with the normal cyclic prefix in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
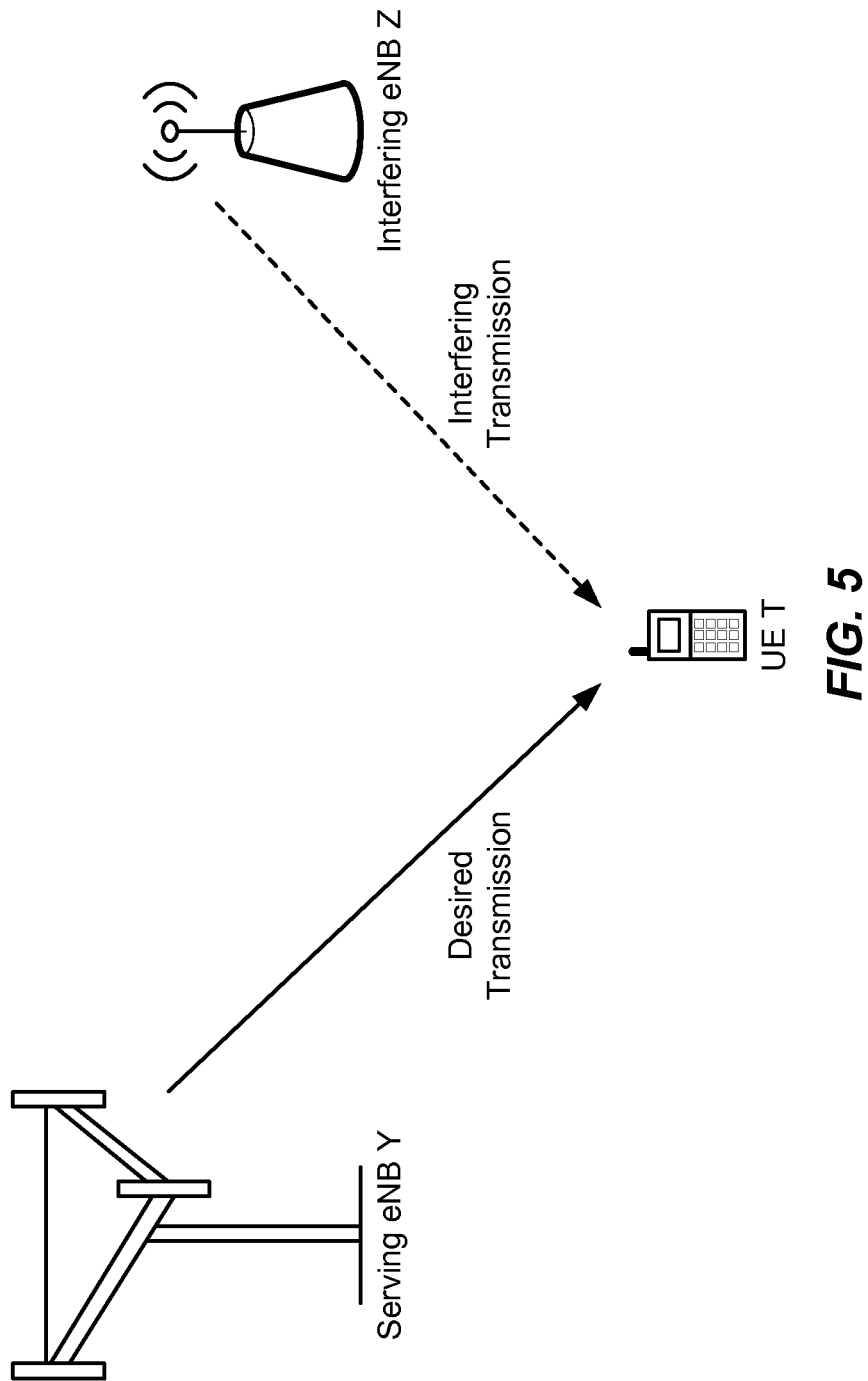
FIG. 5 illustrates an exemplary dominant interference scenario in accordance with certain aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T. Referring back to FIG. 1, for UE 120b connected to pico eNB 110b, the macro eNB 110a may avoid transmitting on allocated/protected resources, possibly except for interfering CRS transmissions. Therefore, based on parameters related to the interference, the UE 120b may determine whether to perform interference cancellation or puncturing on the interfering CRS transmissions.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
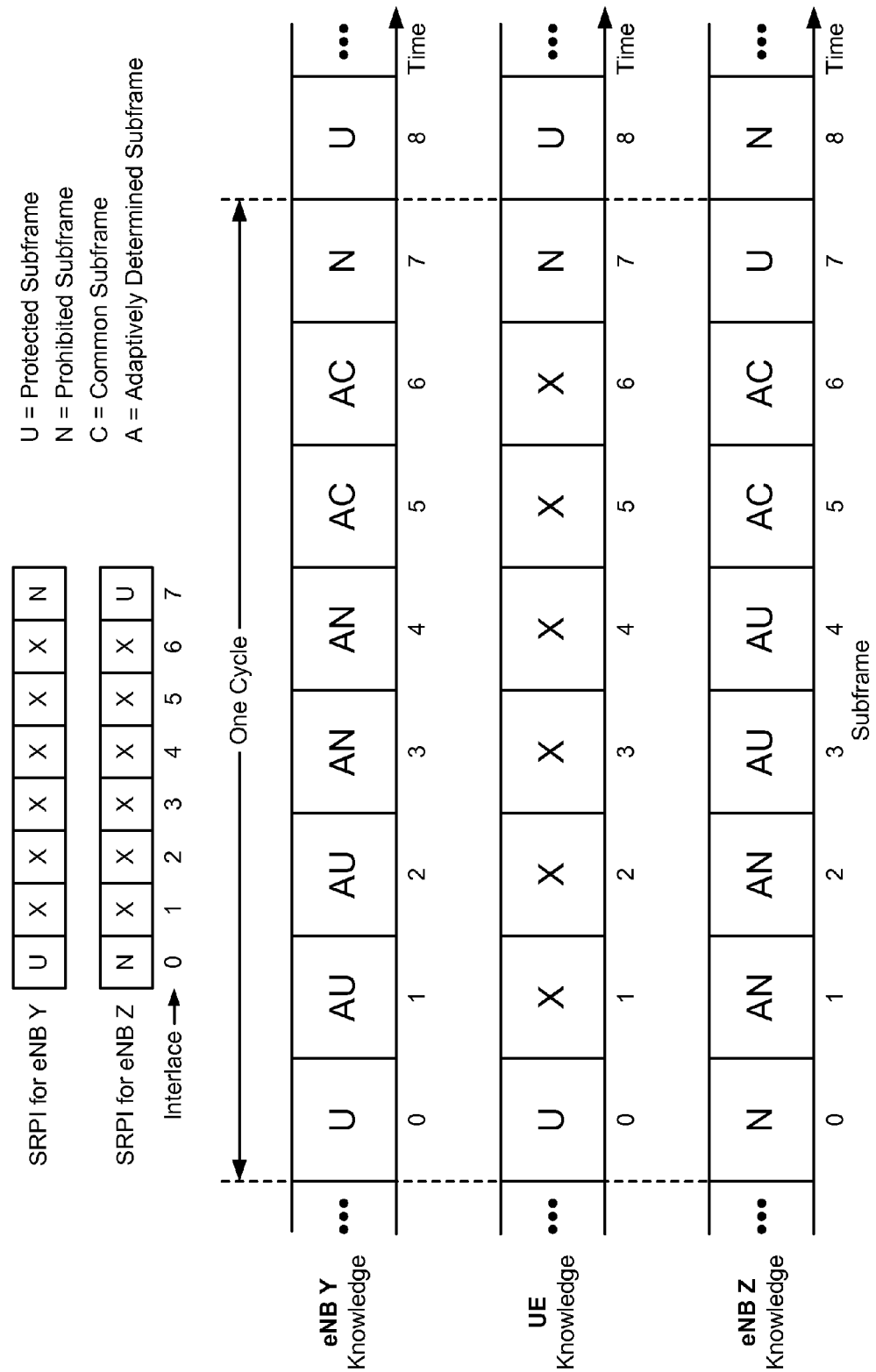
FIG. 6 illustrates example cooperative partitioning of subframes in a heterogeneous network in accordance with certain aspects of the present disclosure.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

Dynamic Switching Between Common Reference Signal Interference Cancellation and Resource Element Puncturing in a Co-Channel Heterogeneous Network As described above, communication in a dominant interference scenario may be supported by performing inter-cell interference coordination (ICIC). According to certain aspects of ICIC, resource coordination/partitioning may be performed to allocate resources to a serving Node B located near the vicinity of a strong interfering Node B. The interfering Node B may avoid transmitting on the allocated/protected resources (e.g., via TDM partitioning, as illustrated in FIG. 6), possibly except for a CRS. A UE can then communicate with the serving Node B on the protected resources in the presence of the interfering Node B and may observe no interference (possibly except for the CRS) from the interfering Node B.

As mentioned above, even with TDM partitioning, CRSs may always be transmitted by an interfering Node B to maintain backward compatibility (e.g., transmitted in almost blank subframes). For example, although resources may be allocated to a serving Node B, the interfering Node B may transmit a CRS using the resources allocated to the serving Node B. As a result, the CRS transmissions from the interfering Node B may cause significant performance degradation.

Therefore, a UE may need to address interference from CRS transmissions of strong interferers. For example, when CRS tones of an interferer may collide with CRS tones of a serving cell (i.e., colliding RS), CRS interference cancellation (IC) may be appropriate, similar to that described in United States Publication No. 2011/0143672, which is hereby incorporated by reference in its entirety. Interference cancellation may enhance UE experience by eliminating coverage holes created by strong interferers, thereby enhancing decoding and measurement performance of the UE.

Performing CRS IC generally includes subtracting CRS transmissions of one or more non-serving Node Bs from the transmissions of the serving Node B and the one or more non-serving Node Bs. For example, a UE may receive signals from a plurality of access points. The access points may be ordered in decreasing signal strength. Using an interference cancellation technique, the UE may estimate channel from the cell with the strongest received signal, reconstruct the common reference signal of the cell with the strongest received signal, and subtract the reconstructed signal from the received signal to cancel the interference caused by the cell with the strongest received signal. The process may be repeated on the received signal to cancel the interference from the other cells.

As another example, when CRS tones of an interferer may collide with control/data tones of a serving cell (i.e., non-colliding RS), either CRS IC or puncturing of interfered resource elements (REs) may be appropriate. Puncturing may involve zeroing out log-likelihood ratios (LLRs) generated from REs under strong interference prior to decoding. For some embodiments, the UE may dynamically switch between CRS IC and RE puncturing based on certain parameters, as will be described herein.

Figure 7:
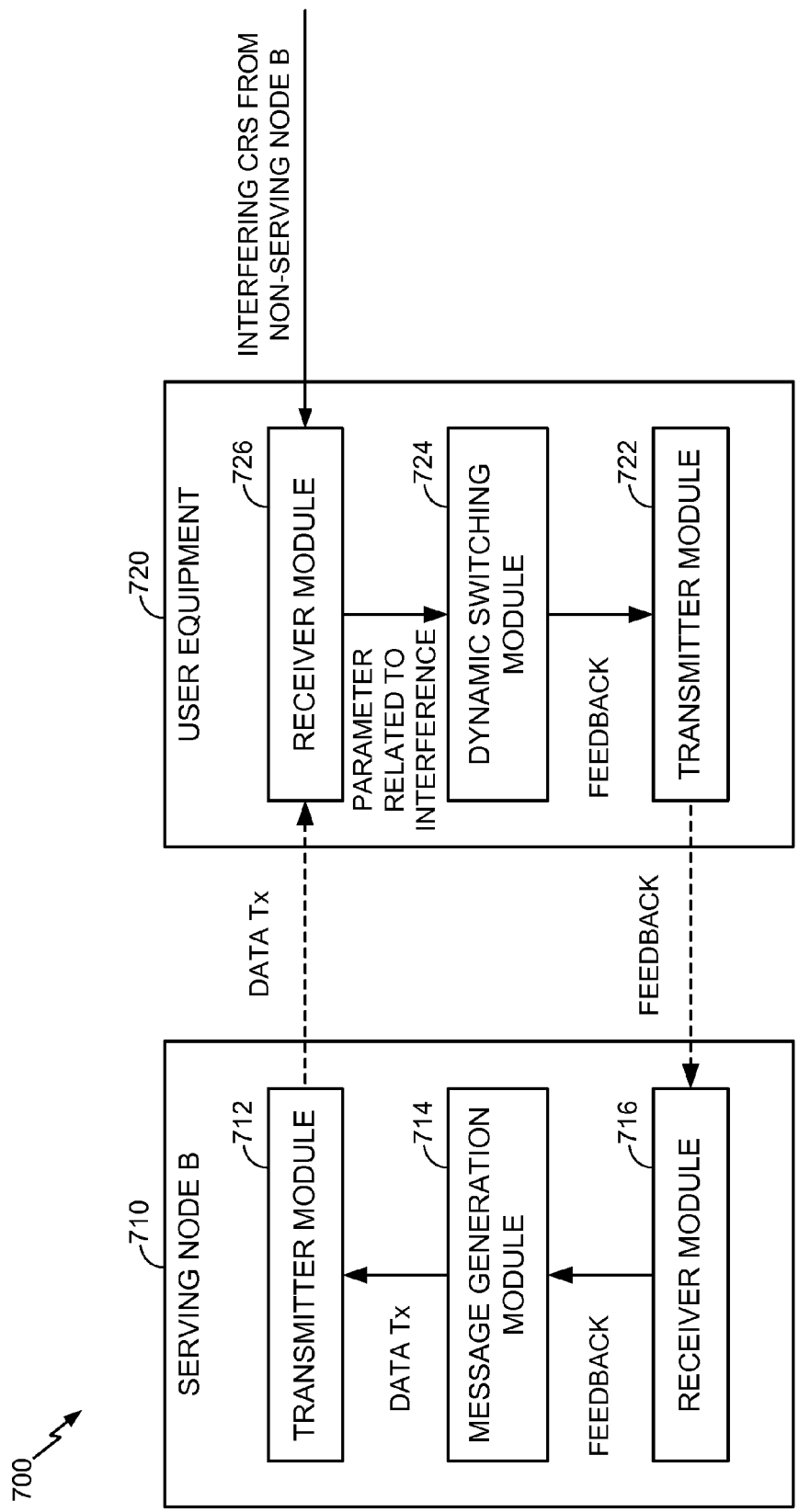
FIG. 7 illustrates an example system with a serving Node B and a UE, capable of dynamically switching between common reference signal interference cancellation (CRS IC) and resource element (RE) puncturing based on parameters related to interference, in accordance with certain aspects of the present disclosure.

FIG. 7 illustrates an example system 700 with a serving Node B 710 and a UE 720, capable of dynamically switching between CRS IC and RE puncturing based on parameters related to interference, in accordance with certain aspects of the present disclosure. As illustrated, the serving Node B 710 may include a message generation module 714 for generating data transmissions. The data transmissions may be transmitted, via a transmitter module 712, to the UE 720.

The UE 720 may receive the data transmissions via a receiver module 726. While the UE 720 receives the data transmissions from the serving Node B 710, the UE 720 may also receive transmissions from one or more non-serving Node Bs that may interfere (e.g., non-colliding RS). The UE 720 may measure a parameter related to the interference and, based on the measured parameter, the UE 720 may determine whether to perform CRS IC or RE puncturing via the dynamic switching module 724, as will be described further herein. The UE 720 may transmit feedback via a transmitter module 722, and the serving Node B 710 may receive the feedback via a receiver module 716.

Figure 8:
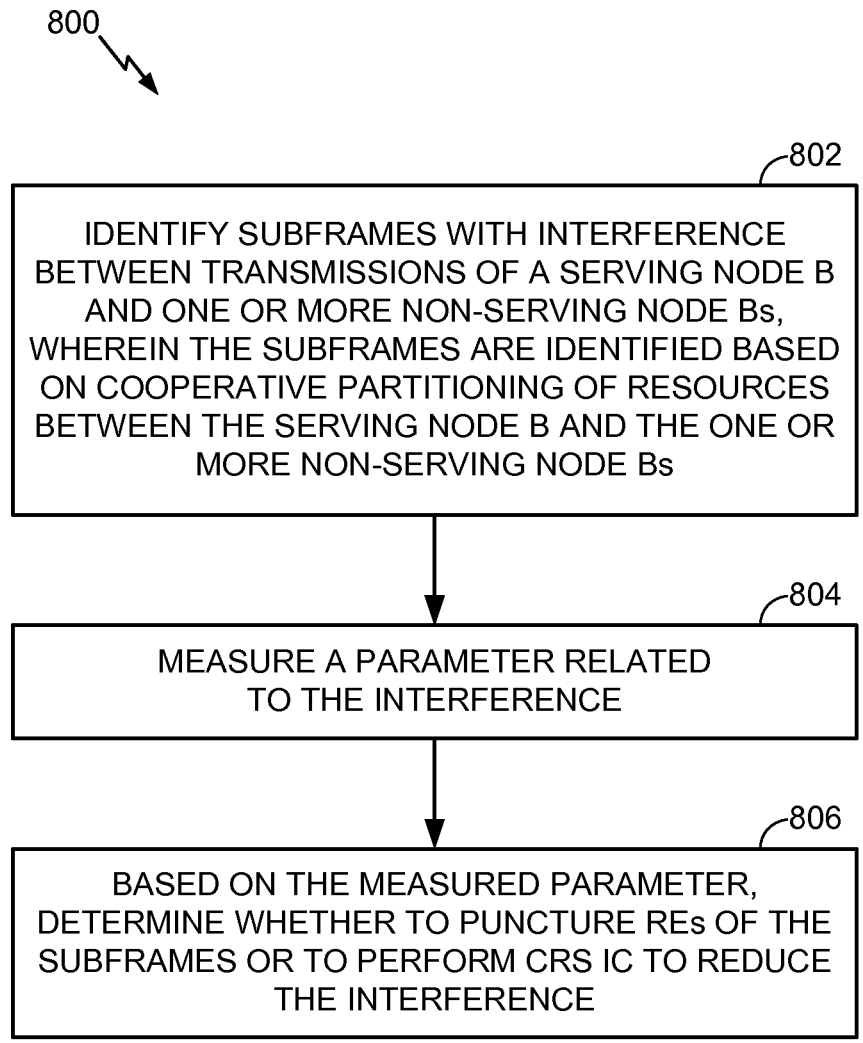
FIG. 8 illustrates example operations for dynamically switching between CRS IC and RE puncturing based on parameters related to interference, in accordance with certain aspects of the present disclosure.

FIG. 8 illustrates example operations 800 for dynamically switching between CRS IC and RE puncturing based on parameters related to interference, in accordance with certain aspects of the present disclosure. The operations 800 may be performed, for example, by a UE.

At 802, the UE may identify subframes with interference between transmissions of a serving Node B and one or more non-serving Node Bs, wherein the subframes may be identified based on cooperative partitioning of resources between the serving Node B and the one or more non-serving Node Bs. The transmissions of the one or more non-serving Node Bs may generally include interfering CRS transmissions, as described above (e.g., non-colliding RS). For example, referring back to subframe format 410 of FIG. 4, the one or more non-serving Node Bs may transmit CRS transmissions on subcarriers of symbol periods 0, 4, 7, or 11 that interfere with data transmissions from the serving Node B.

Identifying strong interferers generally includes measuring a received signal strength for each of the one or more non-serving Node Bs and determining whether the measured received signal strength for at least one of the non-serving Node Bs is greater than a threshold. The threshold may be an absolute metric, where the received signal strength for each of the one or more non-serving Node Bs is compared against an absolute value, or the threshold may be a relative metric, where it may be determined whether the received signal strength for each of the one or more non-serving Node Bs is greater than a received signal strength for the serving Node B.

For some embodiments, measuring the received signal strength for each of the one or more non-serving Node Bs may comprise receiving a strength metric from a neighbor cell search (e.g., using PSS/SSS/PBCH). For some embodiments, measuring the received signal strength for each of the one or more non-serving Node Bs may comprise estimating received CRS power from each of the one or more non-serving Node Bs.

At 804, the UE may measure a parameter related to the interference. The parameter generally includes at least one of a quality measure of CRS IC, a received signal strength of each interferer as described above, a number indicating a quantity of REs that collide with CRS of strong interferers, and a transport block size (TBS).

At 806, based on the measured parameter, the UE may determine whether to perform RE puncturing or CRS IC (dynamic switching). For example, a UE may determine CRS IC is advantageous if the residual interference after CRS IC would be small. Examples of the residual interference after IC being small include if CRS IC quality is good or the strong interference that is canceled is not so strong. As another example, the UE may determine CRS IC is advantageous if the number of REs under strong interference is large, so that puncturing loss may be large. In other words, if the UE determines to perform RE puncturing when the number of REs under strong interference is large, only few REs may be left for decoding, which may not be desirable.

For other embodiments, the UE may determine CRS IC is advantageous if the number of code blocks (in code block segmentation) is large. For a PDSCH transmission, multiple code blocks may be used for the transmission. Since each code block may be encoded and decoded separately, if one code block is not decoded (e.g., due to interference from a non-serving Node B), the PDSCH transmission may fail. The TBS may determine the number of code blocks, and the number of assigned RBs may determine how the code blocks are spread over OFDM symbols. Each code block may span only a few OFDM symbols, and the overall decoding performance may be dictated by the worst code block that spans one of the RS symbols (e.g., symbols 0, 4, 7, or 11 in normal CP) and therefore heavily punctured.

Examples of a UE determining that puncturing is advantageous include if residual interference after IC is large, the number of REs under strong interference is small, or the number of code blocks (in code block segmentation) is small. Therefore, the UE may make a dynamic decision between CRS IC and puncturing based on one or more of CRS IC quality, interference power level, the number of REs under strong interference, or a TBS.

With regards to puncturing, for each of the strong interferers, the UE may know the CRS tone positions of the interferer from its detected cell ID. Therefore, prior to the decoding of a control/data channel (from the serving Node B), the UE may puncture the REs under strong interference. For some embodiments, puncturing the REs of the subframes may comprise zeroing out log-likelihood ratios (LLRs) generated from REs of the subframes that are subject to the interference (i.e., hard puncturing). For some embodiments, puncturing the REs of the subframes may comprise multiplying LLRs generated from REs of the subframes that are subject to the interference by a factor, wherein the factor may be greater than or equal to 0 and less than or equal to 1 (i.e., soft puncturing). In other words, rather than performing hard puncturing, the UE may perform soft puncturing on certain REs, so that the UE may still be able to utilize the soft punctured REs toward decoding.

For some embodiments, the UE may make the dynamic decision for each RE (or subframe, or any time/frequency unit). For example, the UE may determine to do puncturing for REs with large residual interference, and CRS IC for REs with small residual interference. As another example, the UE may make the dynamic decision per interferer. For example, the UE may determine to perform CRS IC for a first non-serving Node B and RE puncturing for a second non-serving Node B, based on parameters related to interference from each non-serving Node B. As yet another example, the UE may make the dynamic decision per group of interferers, where a group of interferers share the same CRS tone locations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   identifying subframes with interference between transmissions of a serving Node B and one or more non-serving Node Bs, wherein the subframes are identified based on cooperative partitioning of resources between the serving Node B and the one or more non-serving Node Bs;
   measuring a parameter related to the interference; and
   based on the measured parameter, determining to puncture resource elements (REs) of the subframes to reduce the interference, wherein puncturing the REs of the subframes comprises multiplying log-likelihood ratios (LLRs) generated from REs of the subframes that are subject to the interference by a factor.

2. The method of claim 1, wherein the parameter comprises at least one of a quality measure of common reference signal interference cancelation (CRS IC), a received signal strength for each of the non-serving Node Bs, a number indicating a quantity of REs that are subject to the interference, and a transport block size (TBS).

3. The method of claim 1, wherein determining to puncture the REs of the subframes is made per subframe, per RE of the subframe, per another time or frequency unit, or per non-serving Node B.

4. The method of claim 1, wherein the transmissions of the one or more non-serving Node Bs comprise common reference signal (CRS) transmissions.

5. The method of claim 1, wherein identifying the subframes with the interference comprises:
   measuring a received signal strength for each of the one or more non-serving Node Bs; and
   determining whether the measured received signal strength for at least one of the non-serving Node Bs is greater than a threshold.

6. The method of claim 5, wherein measuring the received signal strength for each of the one or more non-serving Node Bs comprises receiving a strength metric from a neighbor cell search.

7. The method of claim 5, wherein measuring the received signal strength for each of the one or more non-serving Node Bs comprises estimating received common reference signal (CRS) power from each of the one or more non-serving Node Bs.

8. The method of claim 1, wherein the factor is greater than or equal to 0 and less than or equal to 1.

9. The method of claim 1, further comprising determining to perform common reference signal interference cancelation (CRS IC) to reduce the interference based on the measured parameter.

10. The method of claim 9, wherein the transmissions of the one or more non-serving Node Bs comprise common reference signal (CRS) transmissions, and wherein the determining to perform CRS IC comprises subtracting at least one of the CRS transmissions of the one or more non-serving Node Bs from the transmissions of the serving Node B and the one or more non-serving Node Bs.

11. An apparatus for wireless communications, comprising:
   means for identifying subframes with interference between transmissions of a serving Node B and one or more non-serving Node Bs, wherein the subframes are identified based on cooperative partitioning of resources between the serving Node B and the one or more non-serving Node Bs;

means for measuring a parameter related to the interference; and based on the measured parameter, means for determining to puncture resource elements (REs) of the subframes to reduce the interference, wherein puncturing the REs of the subframes comprises multiplying log-likelihood ratios (LLRs) generated from REs of the subframes that are subject to the interference by a factor.

12. The apparatus of claim 11, wherein the parameter comprises at least one of a quality measure of common reference signal interference cancelation (CRS IC), a received signal strength for each of the non-serving Node Bs, a number indicating a quantity of REs that are subject to the interference, and a transport block size (TBS).

13. The apparatus of claim 11, wherein the means for determining to puncture the REs of the subframes is made per subframe, per RE of the subframe, per another time or frequency unit, or per non-serving Node B.

14. The apparatus of claim 11, wherein the transmissions of the one or more non-serving Node Bs comprise common reference signal (CRS) transmissions.

15. The apparatus of claim 11, wherein the means for identifying the subframes with the interference comprises:
means for measuring a received signal strength for each of the one or more non-serving Node Bs; and
means for determining whether the measured received signal strength for at least one of the non-serving Node Bs is greater than a threshold.

16. The apparatus of claim 15, wherein the means for measuring the received signal strength for each of the one or more non-serving Node Bs comprises means for receiving a strength metric from a neighbor cell search.

17. The apparatus of claim 15, wherein the means for measuring the received signal strength for each of the one or more non-serving Node Bs comprises means for estimating received common reference signal (CRS) power from each of the one or more non-serving Node Bs.

18. The apparatus of claim 11, wherein the factor is greater than or equal to 0 and less than or equal to 1.

19. The apparatus of claim 11, further comprising means for determining to perform common reference signal interference cancelation (CRS IC) to reduce the interference based on the measured parameter.

20. The apparatus of claim 19, wherein the transmissions of the one or more non-serving Node Bs comprise common reference signal (CRS) transmissions, and wherein the means for determining to perform CRS IC comprises means for subtracting at least one of the CRS transmissions of the one or more non-serving Node Bs from the transmissions of the serving Node B and the one or more non-serving Node Bs.

21. An apparatus for wireless communications, comprising:
at least one processor configured to:
identify subframes with interference between transmissions of a serving Node B and one or more non-serving Node Bs, wherein the subframes are identified based on cooperative partitioning of resources between the serving Node B and the one or more non-serving Node Bs;
measure a parameter related to the interference; and
based on the measured parameter, determine to puncture resource elements (REs) of the subframes to reduce the interference, wherein puncturing the REs of the subframes comprises multiplying log-likelihood ratios (LLRs) generated from REs of the subframes that are subject to the interference by a factor; and
a memory coupled to the at least one processor.

22. The apparatus of claim 21, wherein the parameter comprises at least one of a quality measure of common reference signal interference cancelation (CRS IC), a received signal strength for each of the non-serving Node Bs, a number indicating a quantity of REs that are subject to the interference, and a transport block size (TBS).

23. The apparatus of claim 21, wherein the at least one processor configured to determine to puncture the REs of the subframes is made per subframe, per RE of the subframe, per another time or frequency unit, or per non-serving Node B.

24. The apparatus of claim 21, wherein the transmissions of the one or more non-serving Node Bs comprise common reference signal (CRS) transmissions.

25. The apparatus of claim 21, wherein the at least one processor configured to identify the subframes with the interference comprises:
measuring a received signal strength for each of the one or more non-serving Node Bs; and
determining whether the measured received signal strength for at least one of the non-serving Node Bs is greater than a threshold.

26. The apparatus of claim 25, wherein the at least one processor configured to measure the received signal strength for each of the one or more non-serving Node Bs comprises receiving a strength metric from a neighbor cell search.

27. The apparatus of claim 25, wherein the at least one processor configured to measure the received signal strength for each of the one or more non-serving Node Bs comprises estimating received common reference signal (CRS) power from each of the one or more non-serving Node Bs.

28. The apparatus of claim 21, wherein the factor is greater than or equal to 0 and less than or equal to 1.

29. The apparatus of claim 21, wherein the at least one processor is further configured to determine to perform common reference signal interference cancelation (CRS IC) to reduce the interference based on the measured parameter.

30. The apparatus of claim 29, wherein the transmissions of the one or more non-serving Node Bs comprise common reference signal (CRS) transmissions, and wherein the at least one processor configured to determine to perform CRS IC comprises subtracting at least one of the CRS transmissions of the one or more non-serving Node Bs from the transmissions of the serving Node B and the one or more non-serving Node Bs.

31. A computer-program product for wireless communications, the computer-program product comprising:
a non-transitory computer-readable medium having code, executable by a processor, for:
identifying subframes with interference between transmissions of a serving Node B and one or more non-serving Node Bs, wherein the subframes are identified based on cooperative partitioning of resources between the serving Node B and the one or more non-serving Node Bs;
measuring a parameter related to the interference; and
based on the measured, parameter, determining to puncture resource elements (REs) of the subframes or to reduce the interference, wherein puncturing the REs of the subframes comprises multiplying log-likelihood ratios (LLRs) generated from REs of the subframes that are subject to the interference by a factor.

32. The computer-program product of claim 31, wherein the parameter comprises at least one of a quality measure of common reference signal interference cancelation (CRS IC), a received signal strength for each of the non-serving Node Bs, a number indicating a quantity of REs that are subject to the interference, and a transport block size (TBS).

33. The computer-program product of claim 31, wherein the code for determining to puncture the REs of the subframes is made per subframe, per RE of the subframe, per another time or frequency unit, or per non-serving Node B.

34. The computer-program product of claim 31, wherein the transmissions of the one or more non-serving Node Bs comprise common reference signal (CRS) transmissions.

35. The computer-program product of claim 31, wherein the code for identifying the subframes with the interference comprises code for:
   measuring a received signal strength for each of the one or more non-serving Node Bs; and
   determining whether the measured received signal strength for at least one of the non-serving Node Bs is greater than a threshold.

36. The computer-program product of claim 35, wherein the code for measuring the received signal strength for each of the one or more non-serving Node Bs comprises code for receiving a strength metric from a neighbor cell search.

37. The computer-program product of claim 35, wherein the code for measuring the received signal strength for each of the one or more non-serving Node Bs comprises code for estimating received common reference signal (CRS) power from each of the one or more non-serving Node Bs.

38. The computer-program product of claim 31, wherein the factor is greater than or equal to 0 and less than or equal to 1.

39. The computer-program product of claim 31, wherein the code is further executable by a processor for determining to perform common reference signal interference cancelation (CRS IC) to reduce the interference based on the measured parameter.

40. The computer-program product of claim 39, wherein the transmissions of the one or more non-serving Node Bs comprise common reference signal (CRS) transmissions, and wherein the code for determining to perform CRS IC comprises code for subtracting at least one of the CRS transmissions of the one or more non-serving Node Bs from the transmissions of the serving Node B and the one or more non-serving Node Bs.

* * * * *